(12) United States Patent
Li et al.

(10) Patent No.: US 10,179,306 B2
(45) Date of Patent: Jan. 15, 2019

(54) METHODS OF OPERATING PRESSURE SWING ADSORPTION PURIFIERS WITH ELECTROCHEMICAL HYDROGEN COMPRESSORS

(71) Applicant: NUVERA FUEL CELLS, INC., Billerica, MA (US)

(72) Inventors: Zhijiang Li, Franklin, MA (US); Kyle Vanzandt, Allston, MA (US); Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 568 days.

(21) Appl. No.: 14/839,034

(22) Filed: Aug. 28, 2015

(65) Prior Publication Data

US 2016/0059184 A1 Mar. 3, 2016

Related U.S. Application Data

(60) Provisional application No. 62/043,692, filed on Aug. 29, 2014.

(51) Int. Cl.
*C25B 1/02* (2006.01)
*B01D 53/26* (2006.01)
(Continued)

(52) U.S. Cl.
CPC ......... *B01D 53/261* (2013.01); *B01D 53/047* (2013.01); *C25B 1/02* (2013.01); *C25B 15/02* (2013.01); *B01D 2256/16* (2013.01)

(58) Field of Classification Search
CPC ................ B01D 53/326; B01D 53/261; C25B 1/02–1/12
See application file for complete search history.

(56) References Cited

U.S. PATENT DOCUMENTS 3,703,068 A 11/1972 Wagner
5,123,277 A 6/1992 Gray et al.
(Continued)

FOREIGN PATENT DOCUMENTS

WO WO 00/14009 3/2000

OTHER PUBLICATIONS

Partial International Search Report, issued from the European Patent Office in corresponding Application No. PCT/US2015/047409, dated Nov. 5, 2015, 2 pp.

*Primary Examiner* — Nicholas A Smith
(74) *Attorney, Agent, or Firm* — Finnegan, Henderson, Farabow, Garrett & Dunner, LLP (57) ABSTRACT

In accordance with one embodiment, a method of drying a hydrogen gas mixture is disclosed. The method may include determining a mass flow rate of water $\dot{m}_{H2O}$ in a hydrogen gas mixture stream and an adsorbent capacity of one or more adsorbent beds; determining a first period of time based on the determined mass flow rate of water $\dot{m}_{H2O}$ in the hydrogen gas mixture stream and the adsorbent capacity; directing the hydrogen gas mixture stream through a first adsorbent bed of the one or more adsorbent beds for the first period of time; adsorbing a quantity of water from the hydrogen gas mixture stream into the first adsorbent bed; and regenerating the first adsorbent bed.

23 Claims, 4 Drawing Sheets

(51) Int. Cl.
    *C25B 15/02*         (2006.01)
    *B01D 53/047*     (2006.01)

(56) References Cited

U.S. PATENT DOCUMENTS

| | | | |
|---|---|---|---|
| 7,025,801 | B2 | 4/2006 | Monereau |
| 2005/0186458 | A1* | 8/2005 | Rusta-Sallehy ........... C25B 1/06 |
| | | | 204/228.5 |
| 2009/0259323 | A1 | 10/2009 | Kesavan et al. |
| 2010/0285379 | A1* | 11/2010 | Schrieber .......... H01M 8/04201 |
| | | | 429/432 |
| 2013/0160644 | A1* | 6/2013 | Pahwa ................... B01D 53/06 |
| | | | 95/91 |
| 2015/0024298 | A1* | 1/2015 | Blanchet ................. C25L 31/02 |
| | | | 429/432 |

* cited by examiner

METHODS OF OPERATING PRESSURE SWING ADSORPTION PURIFIERS WITH ELECTROCHEMICAL HYDROGEN COMPRESSORS

This application claims the benefit of U.S. Provisional Application No. 62/043,692, filed Aug. 29, 2014, which is incorporated by reference in its entirety.

Embodiments of the present disclosure relate to a pressure swing adsorption (PSA) based purification device, and more particularly, to methods of utilizing a PSA device for drying a wet hydrogen stream from an electrochemical hydrogen compressor (EHC).

An EHC, for example, may selectively transfer hydrogen ions across a membrane within an electrochemical cell. An EHC may include a proton exchange membrane positioned between two electrodes, i.e., an anode and a cathode. Hydrogen gas in contact the anode may be oxidized by applying a voltage potential across the electrodes. Oxidation of a hydrogen molecule produces two electrons and two protons. The two protons are electrochemically driven through the membrane to the cathode, wherein the protons rejoin the two rerouted electrons and reduce back to a hydrogen molecule. The transfer of charge or current within the cell is commonly referred to as the stack current. The reactions taking place at the electrodes can be expressed as oxidation-reduction half-reactions, as shown below.

Anode oxidation reaction: $H_2 \rightarrow 2H^+ + 2e^-$

Cathode reduction reaction: $2H^+ + 2e^- \rightarrow H_2$

Overall electrochemical reaction: $H_2 \rightarrow H_2$

EHCs operating in this manner are sometimes referred to as a hydrogen pumps. When the hydrogen accumulated at the cathode is restricted to a confined space, the cell compresses the hydrogen, and thus raises the pressure within that space. Multiple cells may be linked in series to form a multi-stage EHC. In a multi-stage EHC, for example, the gas flow path, may be configured such that the compressed output gas of the first cell becomes the input gas of the second cell. Alternatively, single-stage cells may be linked in parallel to increase the throughput capacity (i.e., total gas flow rate) of an EHC.

The output of an EHC may include liquid water and water vapor in addition to hydrogen gas. Liquid water may be removed from the output stream by passing the stream through a phase separator. After liquid water has been removed from the output stream, water vapor may be removed from the gas stream. Conventional methods for removing water vapor from a gas stream may entail adsorbing water vapor onto adsorbent materials at certain pressures and temperatures. Examples of these methods include PSA and temperature swing adsorption.

In a conventional PSA process, a hydrogen gas stream containing impurity species may be passed through an adsorbent bed at elevated pressures for a duration of time known as an adsorption time. Elevating the partial pressures of the impurities may cause the impurities to adsorb onto adsorbent materials within the adsorbent bed. After the adsorption time has been reached, the adsorbent bed may be depressurized and purged to remove the impurities and regenerate the adsorption capacity of the adsorbent materials. Typically, the adsorption time is fixed.

In consideration of the aforementioned factors, the present disclosure is directed toward methods of utilizing a PSA device for drying a wet hydrogen stream. In addition, an EHC may supply the wet hydrogen stream to the PSA device, and the feeding (adsorption)/regeneration cycle time of the PSA device may be optimized or controlled based on operating parameters of the EHC.

PSA devices may separate gas fractions from gas mixtures by coordinating pressure cycling and flow reversal over an adsorbent material in an adsorbent bed. The adsorbent material may have a pressure sensitive affinity to at least one component in the gas mixture, and may more readily adsorb this gas component compared to at least one other component of the gas. During operation, a component of the gas stream can adsorb onto the adsorbent bed as the gas pressure in the bed is increased. A "light" product, i.e., the gas stream without the adsorbed gas, can be removed from the bed. The materials in an adsorbent bed can adsorb a finite mass of the gas component. The adsorbent bed may be regenerated by decreasing its pressure, such that the adsorbed gas desorbs back into a gas phase. The desorbed gas, i.e., the "heavy" product is then exhausted from the adsorbent bed. The process of increasing the pressure in the adsorbent bed and adsorbing a gas component is considered "feeding," whereas the process of decreasing the pressure in the adsorbent bed and desorbing the gas component is considered "regeneration," For example, an adsorbent bed may adsorb a maximum quantity of molecules of a gas component when it reaches a saturation limit. The adsorbent bed must be regenerated before adsorbing more of this gas component, while it is at the saturation limit. The adsorbent beds can be cycled through feeding and regeneration processes for equal periods of time; this is referred to as a constant switching time.

The applicant has discovered that when a mass flow rate of a gas component into a PSA device is not constant, using a constant switching time may result in inefficiencies with the PSA device. This may also cause unnecessary rapid switching, which may result in increased wear on some of the components of the PSA device, such as the valves. The applicant has discovered that by adjusting the switch time for a PSA device as a function of the operating parameters of the PSA device and the EHC, the size of the adsorbent beds may be reduced and the efficiency of the PSA device may be increased.

In accordance with one embodiment, a method of drying a hydrogen gas mixture is disclosed. The method may include determining a mass flow rate of water $\dot{m}_{H2O}$ in a hydrogen gas mixture stream and an adsorbent capacity of one or more adsorbent beds; determining a first period of adsorption time based on the determined mass flow rate of water $\dot{m}_{H2O}$ in the hydrogen gas mixture stream and the adsorbent capacity; directing the hydrogen gas mixture stream through a first adsorbent bed of the one or more adsorbent beds for the first period of time; adsorbing a quantity of water from the hydrogen gas mixture stream into the first adsorbent bed; and regenerating the first adsorbent bed.

Various embodiments of the disclosure may include one or more of the following aspects: determining a second period of adsorption time based on the determined mass flow rate of water $\dot{m}_{H2O}$ in the hydrogen gas mixture stream and the adsorbent capacity, and directing the hydrogen gas mixture stream through the first adsorbent bed for a second period of time, wherein the first period of time is different than the second period of time; directing the hydrogen gas mixture stream through a second adsorbent bed of the one or more adsorbent beds during the second period of time, and adsorbing a quantity of water from the hydrogen gas mixture stream into the second adsorbent bed the quantity of water adsorbed by the first adsorbent bed during the first time period may be substantially the same as the quantity of water adsorbed by the second adsorbent bed during the second time period; each of the quantity of water adsorbed by the first adsorbent bed during the first time period and the quantity of water adsorbed by the second adsorbent bed during the second time period may be less than the maximum quantity of water that can be adsorbed by the respective first and second adsorbent beds; regenerating the first adsorbent bed may include directing a different gas stream through the first adsorbent bed, and desorbing a quantity of water from the first adsorbent bed into the different gas stream; the hydrogen gas mixture stream may be supplied by an electrochemical hydrogen compressor or electrolyzer; the different gas stream may be a dry hydrogen gas stream; at least a portion of the different gas stream may include a portion of the hydrogen gas mixture stream after the hydrogen gas mixture stream passes through the first adsorbent bed; the mass flow rate of water $\dot{m}_{H2O}$ may be determined at least by measuring the amount of water in the hydrogen gas mixture stream; and determining an electrochemical hydrogen compressor or electrolyzer stack current i, an electrochemical hydrogen compressor or electrolyzer outlet temperature T, an electrochemical hydrogen compressor or electrolyzer outlet pressure $P_{tot}$, and a constant k, wherein the mass flow rate of water $\dot{m}_{H2O}$ may be determined at least by calculating the amount of water in the hydrogen gas mixture stream according to an equation $\dot{m}_{H2O}=k*i*T/P_{tot}$.

In another embodiment of the disclosure, a method of operating a pressure swing adsorption purifier is disclosed. The method may include supplying a hydrogen gas mixture stream from an electrochemical hydrogen compressor to the pressure swing adsorption purifier; supplying a different gas stream to the pressure swing adsorption purifier. The pressure swing adsorption purifier may include at least one first adsorbent bed and at least one second adsorbent bed. Further, the method may include feeding the at least one first adsorbent bed, which may include adsorbing water from the hydrogen gas mixture stream into the at least one first adsorbent bed; regenerating the at least one second adsorbent bed, which may include desorbing water from the at least one second adsorbent bed into the different gas stream; feeding the at least one second adsorbent bed, which may include adsorbing water from the hydrogen gas mixture stream into the at least one second adsorbent bed; regenerating the at least one first adsorbent bed, which may include desorbing water from the at least one first adsorbent bed into the different gas stream; and switching between feeding the at least one first adsorbent bed and regenerating the at least one second adsorbent bed according to a switching time.

Various embodiments of the disclosure may include one or more of the following aspects: repeating switching between feeding the at least one first adsorbent bed and regenerating the at least one second adsorbent bed according to a different switching time; determining a mass flow rate of water $\dot{m}_{H2O}$ in the hydrogen gas mixture stream, wherein the switching time may be determined at least on the determined mass flow rate of water $\dot{m}_{H2O}$; the mass flow rate of water $\dot{m}_{H2O}$ may be determined at least by measuring the amount of water in the hydrogen gas mixture stream; and the hydrogen gas mixture stream may be supplied by an electrochemical hydrogen compressor or electrolyzer and the method may further comprise: determining the electrochemical hydrogen compressor or electrolyzer stack current i, the electrochemical hydrogen compressor or electrolyzer outlet temperature T, the electrochemical hydrogen compressor or electrolyzer outlet pressure $P_{tot}$, and a constant k, wherein the mass flow rate of water $\dot{m}_{H2O}$ may be determined at least by calculating the amount of water in the hydrogen gas mixture stream according to an equation $\dot{m}_{H2O}=k*i*T/P_{tot}$.

In another embodiment, a controller for operating one or more downstream valves of an electrochemical hydrogen compressor or an electrolyzer is disclosed. The controller may include a temperature sensor configured to measure the outlet temperature of the electrochemical hydrogen compressor or the electrolyzer; a circuit configured to determine the stack current of the electrochemical hydrogen compressor or the electrolyzer; and a pressure sensor configured to measure the outlet pressure of the electrochemical hydrogen compressor or the electrolyzer. The controller may be configured to determine an outlet mass flow rate of water in a hydrogen gas mixture stream based on the outlet temperature, the stack current, and the outlet pressure. In addition, the one or more valves may include a first valve and the controller may be configured to open and close the first valve based at least on the determined outlet mass flow rate of water.

Various embodiments of the disclosure may include one or more of the following aspects: the controller may be configured to determine a switching time based at least on the outlet mass flow rate of water for opening and closing the first valve, and the first valve may be opened and closed based on the switching time; the electrochemical hydrogen compressor or the electrolyzer may be in fluid communication a pressure swing adsorption purifier having a first adsorbent bed, and the controller may be configured to open and close the first valve based at least on an adsorbent capacity of the adsorbent bed; the pressure swing adsorption purifier may include a second adsorbent bed, and the controller may be configured to determine a switching time for opening and closing the first valve based at least on the determined outlet mass flow rate of water, the adsorbent capacity of the first adsorbent bed, and an adsorbent capacity of the second adsorbent bed, and the first valve may be opened and closed based on the switching time; and the one or more valves may include a second valve and the controller may be configured to open and close the second valve based at least on the determined outlet mass flow rate of water, and the first valve and the second valve may be opened asynchronously or closed asynchronously.

Additional objects and advantages of the embodiments will be set forth in part in the description that follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the disclosure, and together with the description, serve to explain the principles of the disclosure.

Reference will now be made in detail to the exemplary embodiments of the present disclosure described below and illustrated in the accompanying drawings. Wherever possible, the same reference numbers will be used throughout the drawings to refer to same or like parts.

While the present disclosure is described herein with reference to illustrative embodiments of a pressure swing adsorption based purification device, it is understood that the devices and methods of the present disclosure may be employed with various types of electrochemical cells, including, but not limited to any suitable hydrogen compressors, fuel cells, electrolysis cells, hydrogen purifiers, and hydrogen expanders. Those having ordinary skill in the art and access to the teachings provided herein will recognize additional modifications, applications, embodiments, and substitution of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

Figure 1:
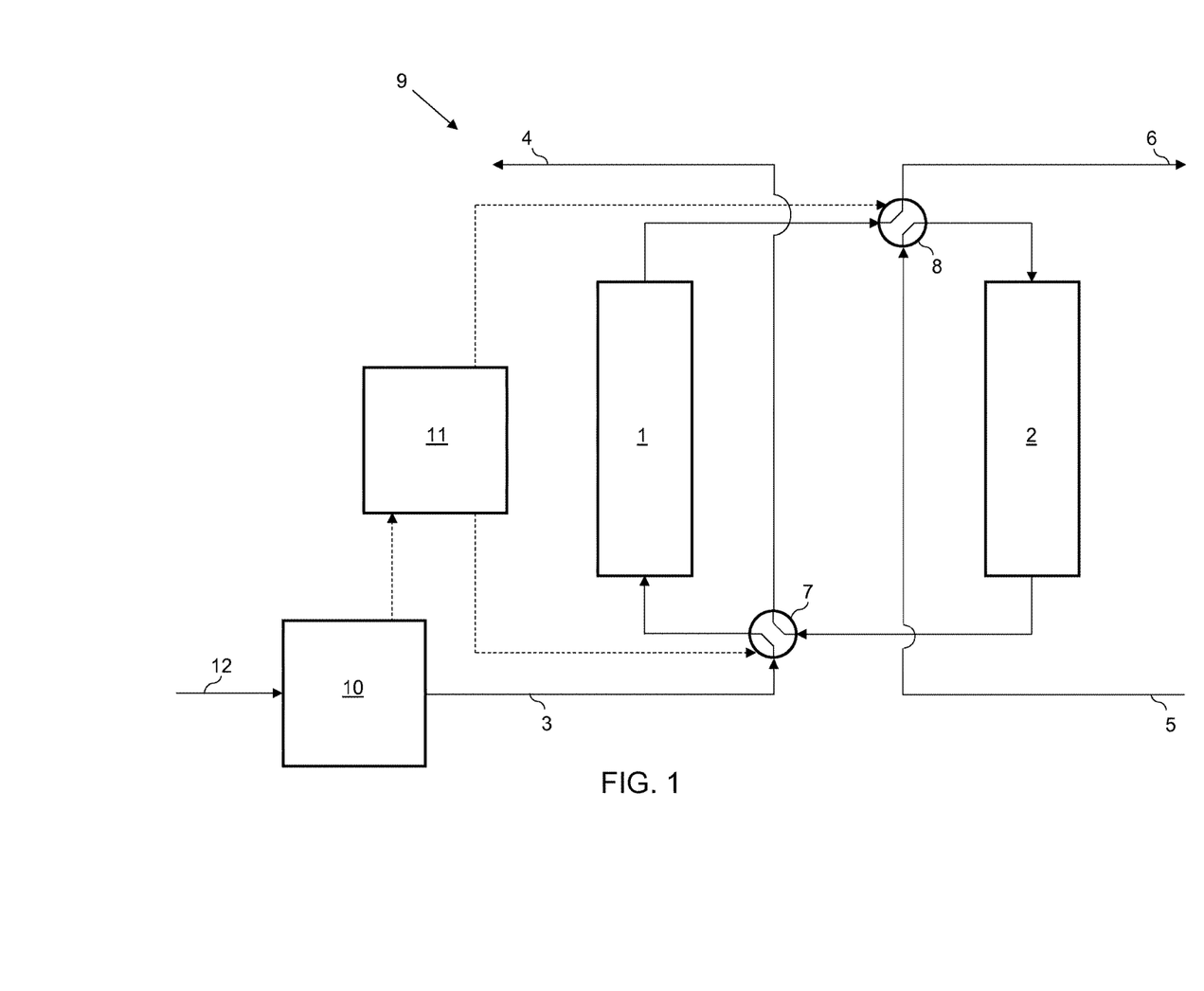
FIG. 1 illustrates a diagram of a pressure swing adsorption based purification device, according to an embodiment of the present disclosure.
Figure 2:
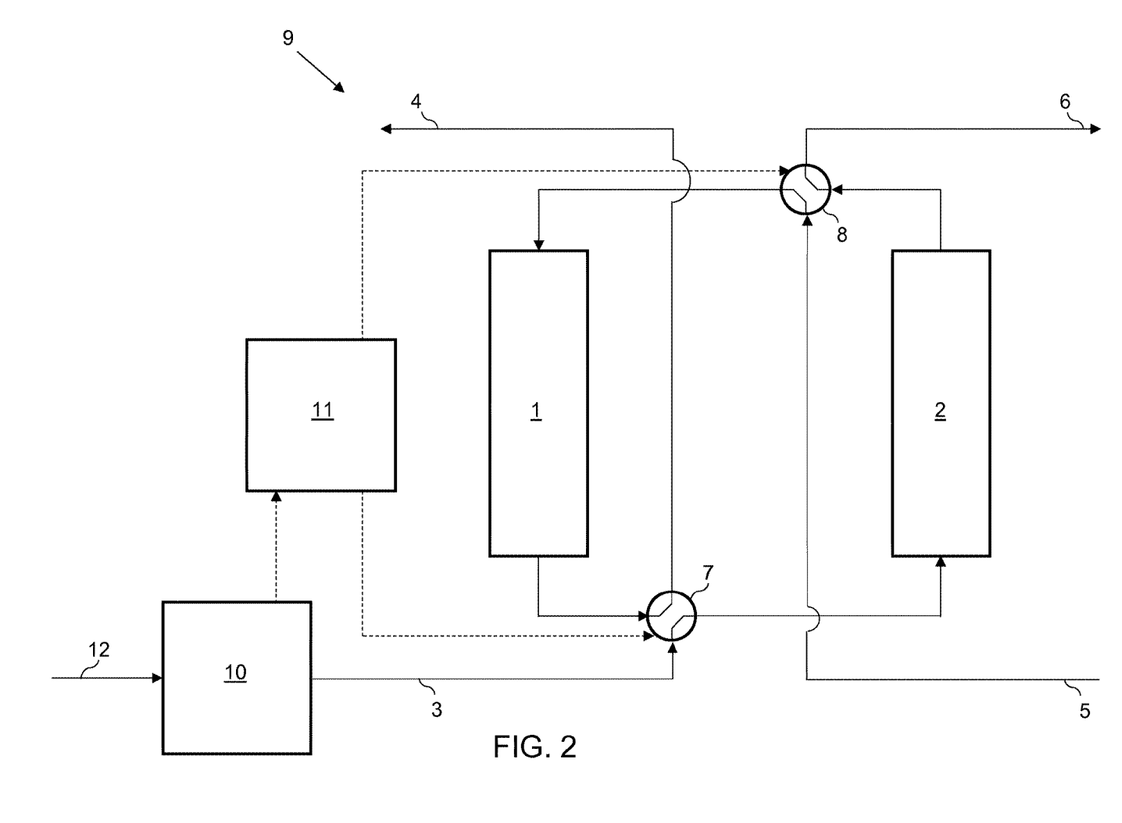
FIG. 2 illustrates a diagram of a pressure swing adsorption based purification device, according to an embodiment of the present disclosure.

FIG. 1 depicts a schematic of a PSA device 9 in a first configuration, according to an exemplary embodiment of the present disclosure. The PSA device 9 includes a first adsorbent bed 1, a second adsorbent bed 2, a first four-way valve 7 having first and second configurable positions, and a second four-way valve 8, also having first and second configurable positions. Similarly, FIG. 2 depicts the PSA device 9 in a second configuration. In the first configuration, the four-way valves 7 and 8 are in the first position, whereas in the second configuration, the four-way valves 7 and 8 are in the second position.

In an adsorption or feeding operation, according to an exemplary embodiment, an EHC 10 (or an electrolyzer) may receive and pressurize a hydrogen gas mixture 12 and supply a hydrogen gas mixture 3 (e.g., a stream of wet hydrogen gas that includes hydrogen gas and water vapor) to the four-way valve 7. When the four-way valve 7 is in the first position, the hydrogen gas mixture 3 may be routed to the first adsorbent bed 1. The hydrogen gas mixture 3 may establish a pressure gradient across the first adsorbent bed 1 in the direction from the four-way valve 7 towards the four-way valve 8. The first adsorbent bed 1 may comprise a material having an affinity to water that increase with increasing pressure. As a non-limiting example, the first adsorbent bed 1 may comprise one or more of a desiccant, such as silica, carbon or silicon nanoparticles, surface treated particles, aluminum oxide, and zeolites. Due to the pressure of the hydrogen gas mixture 3, the first adsorbent bed 1 may adsorb a fraction of the water vapor from the hydrogen gas mixture 3, such that the gas becomes dryer. This dryer gas is represented as dry hydrogen gas 6 in FIG. 1. After the removal of a portion or all of the water vapor from the hydrogen gas mixture 3, the dry hydrogen gas 6 may exit through the four-way valve 8.

Simultaneously, a regeneration operation may take place in the second adsorbent bed 2 as the adsorption operation takes place in the first adsorbent bed 1. During this regeneration operation, dry hydrogen gas 5 may be supplied to the four-way valve 8. During this operation, the dry hydrogen gas 5 may be at a lower pressure than the dry hydrogen gas 6. Dry hydrogen gas 5 may be supplied from a discrete hydrogen gas source (not shown), or it may be shunted from the dry hydrogen gas 6 to a lower pressure. When the four-way valve 8 is in the first position, the dry hydrogen gas 5 may be routed to the second adsorbent bed 2. Due to the lower pressure of the dry hydrogen gas 5 compared to the pressure of either the hydrogen gas mixture 3 or the dry hydrogen gas 6, the dry hydrogen gas 5 may desorb a fraction of adsorbed water in the second adsorbent bed 2, such that the gas becomes humid. This humid gas is represented as wet hydrogen gas 4. After the addition of water to the dry hydrogen gas 5, the wet hydrogen gas 4 may exit through the four-way valve 7.

FIG. 2 shows the adsorption and regeneration cycle of the PSA device 9 in a second configuration. The second configuration differs from the first configuration in that the four-way valves 7 and 8 are in theft second positions instead of their first positions. During the adsorption cycle, the first adsorbent bed 1 may adsorb water until it reaches a maximum capacity, or a saturation limit. To prevent the first adsorbent bed 1 from becoming fully saturated, or to allow the first adsorbent bed 1 to be able to remove a quantity of water that would otherwise exceed the quantity of water at its saturation limit, the PSA device 9 may reverse its adsorption and regeneration cycles, i.e., the first adsorbent bed 1 regenerates and the second adsorbent bed 2 removes water vapor from the hydrogen gas mixture 3.

After the four-way valves 7 and 8 have switched from the first position to the second position, the EHC 10 may continue to supply the hydrogen gas mixture 3 to the four-way valve 7. The hydrogen gas mixture 3 may be routed to the second adsorbent bed 2, due to the four-way valve 7 being in the second position. The hydrogen gas mixture 3 may establish a pressure gradient across the second adsorbent bed 2 in the direction from the four-way valve 7 towards the four-way valve 8. The second adsorbent bed 2 may also comprise adsorbing materials, similarly to the first adsorbent bed 1. In some embodiments, the adsorbing materials in the second adsorbing bed 2 may be different the adsorbing materials in the first adsorbing bed 1. Due to the pressure of the hydrogen gas mixture 3, the second adsorbent bed 2 may adsorb a fraction of the water vapor from the hydrogen gas mixture 3, such that the gas becomes dryer. This dryer gas is represented as dry hydrogen gas 6 in FIG. 2. After the removal of water vapor from the hydrogen gas mixture 3, the dry hydrogen gas 6 may exit through the four-way valve 8.

Simultaneously, a regeneration operation may take place in the first adsorbent bed 1 as the adsorption operation takes place in the second adsorbent bed 2. During this regeneration operation, dry hydrogen gas 5 may be supplied to the four-way valve 8. The dry hydrogen gas 5 may be routed to the first adsorbent bed 1 due to the four-way valve 8 being in the second position. Due to the lower pressure of the dry hydrogen gas 5 compared to pressure of either the hydrogen gas mixture 3 or the dry hydrogen gas 6, the dry hydrogen gas 5 may desorb a fraction of adsorbed water in the first adsorbent bed 1, such that the gas becomes humid. This humid gas is represented as wet hydrogen gas 4. After the addition of water to the dry hydrogen gas 5, the wet hydrogen gas 4 may exit through the four-way valve 7. After exiting the PSA device 9, the wet hydrogen gas 4 may be recycled back to the EHC 10, or it may be used in other processes. For example, the wet hydrogen gas 4 may be routed to a burner to generate heat for other processes.

The PSA device 9 may switch from the first configuration to the second configuration before the first adsorbent bed 1 becomes fully saturated. Likewise, the PSA device 9 may switch from the second configuration to the first configuration before the second adsorbent bed 2 becomes fully saturated. To determine the operational switch times, a controller 11 may actuate the four-way valves 7 and 8, e.g., in the form of solenoids, based on operational parameters of the PSA device 9 and/or the EHC 10.

For example, the mass flow rate of hydrogen gas and water vapor of the hydrogen gas mixture 3 may be determined based on the measurements from the EHC 10, such as stack current, temperature, pressure, relative humidity, and volumetric flow rates. The controller 11 may perform an integral control by integrating the mass flow rate of water to calculate the mass of water in the hydrogen gas mixture 3 over a given period of time. The mass flow rate of hydrogen and water may be determined by calculating partial pressures for each of the hydrogen and water in the hydrogen gas mixture 3. For example, the mass flow rate of water may be determined by solving equation 1, wherein $\dot{m}_{H2O}$ is the mass flow rate of water, $\dot{m}_{H2O}$ is the mass flow rate of hydrogen, $\hat{m}_{H2O}$ is the molecular weight of water, $\hat{m}_{H2O}$ is the molecular weight of hydrogen, $P_{H2O}$ is the partial pressure of water, and $P_{tot}$ is the outlet pressure of the EHC (or electrolyzer).

$$\dot{m}_{H2O} = \dot{m}_{H2} \cdot \frac{\hat{m}_{H2O}}{\hat{m}_{H2}} \cdot \frac{P_{H2O}}{P_{tot}} \qquad \text{Equation 1}$$

Moreover, equation 1 can be rewritten in terms of water concentration $C_{H2O}$ as equation 2, wherein $k_1$ is a constant.

$$\dot{m}_{H2O} = \dot{m}_{H2} \cdot k_1 \cdot C_{H2O} \qquad \text{Equation 2}$$

Thus, the mass flow rate of water can be determined by directly measuring the mass flow rate of hydrogen and the concentration of water.

In addition, the applicant has found that the mass flow rate of hydrogen is proportional to the EHC stack current i, and the mass flow rate of hydrogen is proportional to EHC outlet temperature T. Therefore, the mass flow rate of hydrogen may be expressed by equation 3, wherein $k_2$ is a constant.

$$\dot{m}_{H2O} = k_2 \cdot i \cdot \frac{T}{P_{tot}} \qquad \text{Equation 3}$$

Further, a partial pressure of any impurity in the hydrogen gas mixture 3 may calculated. In addition, the maximum amount of water that the adsorbent beds 1 and 2 may adsorb can be calculated based on the volume of the adsorbent beds 1 and 2, the adsorbent density of the adsorbent material, and the adsorbent capacity of the adsorbent material. The adsorbent density and adsorbent capacity of the adsorbent materials may be known quantities.

The controller 11 may switch between the adsorbing and regeneration operations of the PSA device 9 when the calculated mass of water in the hydrogen gas mixture 3 equals or exceeds the saturation limit of the adsorbent beds 1 and 2. In addition, a safety factor may be applied to this comparison, such that switching may occur when the mass of water in the hydrogen gas mixture 3 equals a predetermined percentage of the saturation limit of the adsorbent beds 1 and 2. For example, if a safety factor of 2 is selected, switching may occur when the mass of water adsorbed in the adsorbent beds 1 and 2 reaches 50% of its saturation limit. A safety factor between 1 and 10 may be selected, although a safety factor higher than 10 may be selected as well. Switching may occur when the controller 11 sends a control signal to the valves 7 and 8.

The mass flow rate of water in the hydrogen gas mixture 3 may vary during operation. Thus, the adsorbing and regeneration operations of the PSA device 9 may be optimized by adjusting the switch time based on the mass of water inputted into the adsorbent beds 1 and 2 during the respective adsorbing operations.

Although only adsorbent beds 1 and 2 are depicted in FIGS. 1 and 2, the PSA device 9 may include additional adsorbent beds N. Any of the adsorbent beds N may have the same capacity of either adsorbent beds 1 or 2, or it may have a different capacity. Furthermore, any of the adsorbent beds N may operate at the same phase as adsorbent beds 1 or 2, or it may operate at different phase (or asynchronously). For example, an additional adsorbent bed N1 may operate in an adsorbing operation, such that a valve controlling the input of the hydrogen gas mixture 3 opens at some time period after the four-way valve 7 is switched to the first position. Likewise, a different valve controlling the input of a dry hydrogen gas 5 to the adsorbent bed N1 may open at some time period after the four-way valve is switched to the second position, thus switching the operation of adsorbent bed N1 to a regenerating operation.

In other embodiments, switching times of the feeding and regeneration operations of the PSA device 9 may be initially predetermined. In addition, the mass flow rate of water in the hydrogen gas mixture 3 may be calculated, and when this value increases by a predetermined amount, the switching time may temporarily increase to accommodate an increase in water that the adsorbent beds 1 and 2 may remove. After the mass flow rate of water in the hydrogen gas mixture 3 drops below a predetermined value, the switching time may return to its initial value.

In other embodiments, feedback control of the switching time may also be employed. For example, the amount of water in the dry hydrogen gas 8, the wet hydrogen gas 5, and/or the first and second adsorbent beds 1 and 2 may be directly measured by humidity and/or chemical sensors (not shown). The controller 11 may receive feedback from humidity and/or chemical sensors and may adjust the switching times that were previously calculated from the parameters of the EHC 10 and PSA device 9 based on these measurements.

In other embodiments, only one adsorbent bed may be used. For this process, the flow of a hydrogen gas mixture may be supplied to a first two-way valve. When the first two-way valve is opened, the hydrogen gas mixture may flow to the adsorbent bed. In the adsorbent bed, water may be adsorbed in a similar manner as adsorbent beds 1 and 2 described above. The light gas may exit the adsorbent bed through a second two-way valve.

Next, the adsorbent bed may be regenerated. For this process, the first and second two-way valves may close at substantially the same time. In some embodiments, the second two-way valve may close prior to the first two-way valve closing. At this point, flow of the hydrogen gas mixture into the adsorbent bed may be temporarily stopped. To accommodate a potential increase in pressure, a tank positioned in series with and between the ECH and PSA device may serve as a buffer. Alternatively, the flow of the hydrogen gas mixture may be diverted to a holding tank to temporarily store the gas while the adsorbent bed is regenerating. The adsorbent bed may regenerate by flowing a dry hydrogen gas through it at low pressure as with the first and second adsorbent beds described above. This may be accomplished through two additional two-way valves. Specifically, a third two-way valve may be positioned between the dry hydrogen gas supply and the adsorbent bed, and a fourth two-way valve may serve as an exit to vent off the heavy gas. Once the bed has regenerated, the third and fourth two-way valves may close, and the first and second two-way valves may open.

Figure 3:
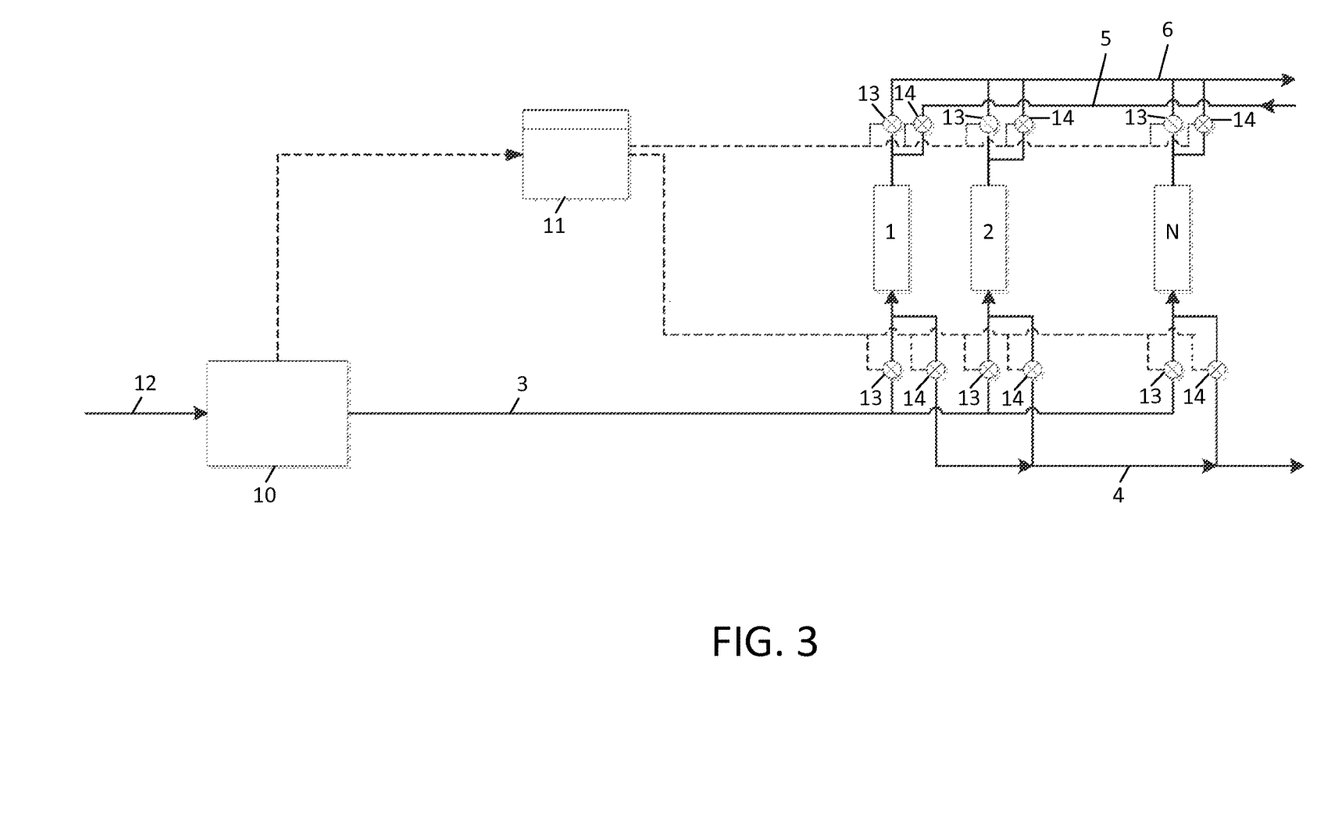
FIG. 3 illustrates a diagram of a pressure swing adsorption based purification device, according to an embodiment of the present disclosure.

FIG. 3 depicts another embodiment of a PSA device. This embodiment may operate substantially similar to the embodiment disclosed in FIGS. 1 and 2 discussed above. However, the PSA device may include a pair of two-way valves 13 and 14, in the position of the four-way valves 7 and 8. During an adsorption operation, the controller 11 may send a control signal to simultaneously open two (2) of two-way valves 13 and close two (2) of the two-way valves 14 associated with a particular adsorbent bed. Also, during a regeneration operation, the controller 11 may send a control signal to simultaneously close two (2) of two-way valves 13 and open two (2) of the two-way valves 14 associated with a particular adsorbent bed.

Figure 4:
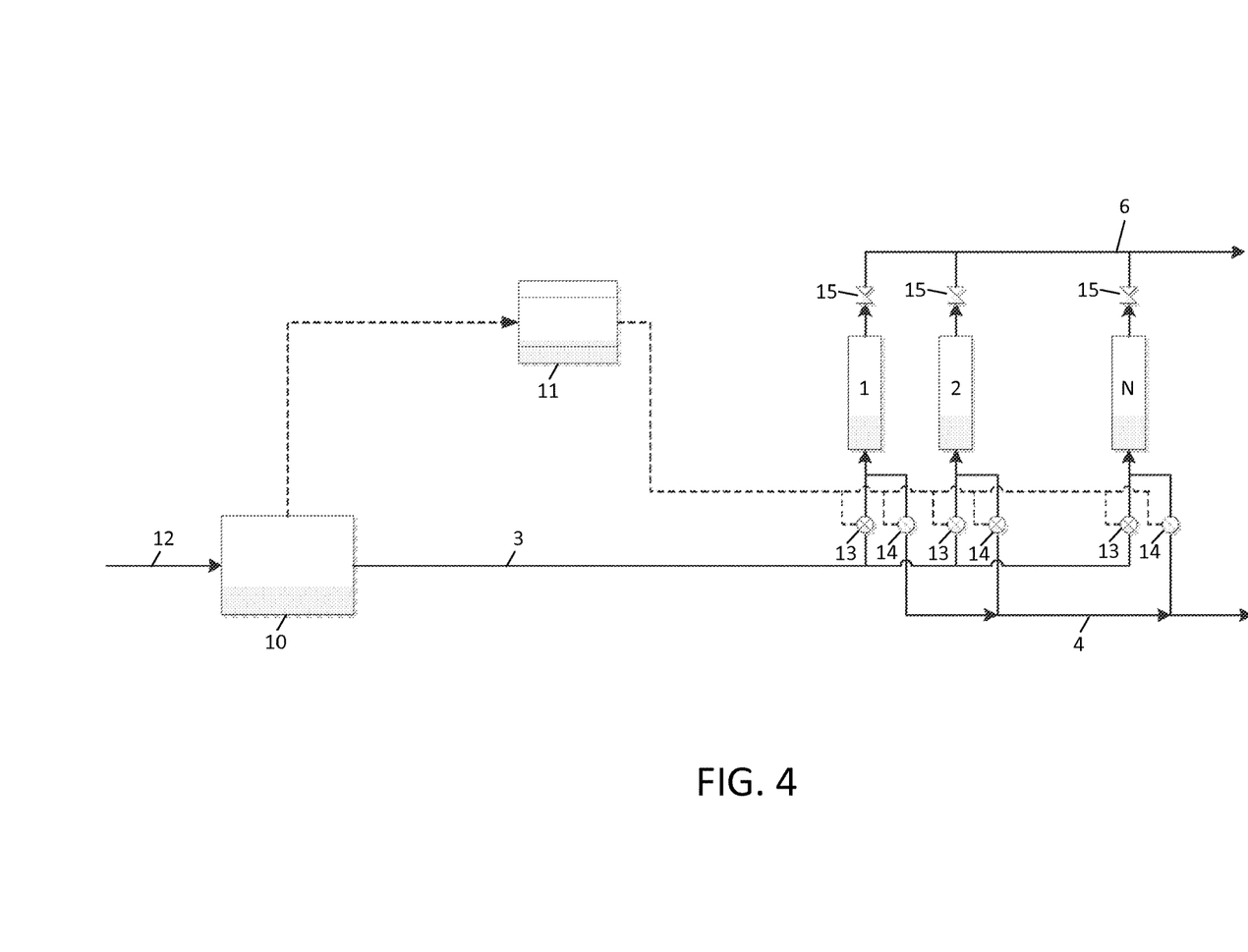
FIG. 4 illustrates a diagram of a pressure swing adsorption based purification device, according to an embodiment of the present disclosure.

FIG. 4 depicts another embodiment of a PSA device. This embodiment may operate substantially similar to the embodiment disclosed in FIG. 3 and discussed above. However, the PSA device may include a check valve 15, in place of one (1) of the pairs of two-way valves 13 and 14 associated with each adsorbent bed. Preferably, the check valve is positioned between the adsorbent beds and the dry hydrogen gas 6.

What is claimed is:

1. A method of drying a hydrogen gas mixture, comprising:
    determining a mass flow rate of water $\dot{m}_{H2O}$ in a hydrogen gas mixture stream at a point prior to entering one or more adsorbent beds and an adsorbent capacity of the one or more adsorbent beds;
    determining a first period of time based on the determined mass flow rate of water $\dot{m}_{H2O}$ in the hydrogen gas mixture stream and the adsorbent capacity;
    directing the hydrogen gas mixture stream through a first adsorbent bed of the one or more adsorbent beds for the first period of time;
    adsorbing a quantity of water from the hydrogen gas mixture stream into the first adsorbent bed for the first period of time; and
    regenerating the first adsorbent bed.

2. The method of claim 1, further comprising:
    determining a second period of time based on the determined mass flow rate of water $\dot{m}_{H2O}$ in the hydrogen gas mixture stream and the adsorbent capacity; and
    directing the hydrogen gas mixture stream through the first adsorbent bed for a second period of time;
    wherein the first period of time is different than the second period of time.

3. The method of claim 2, further comprising:
    directing the hydrogen gas mixture stream through a second adsorbent bed of the one or more adsorbent beds during the second period of time; and
    adsorbing a quantity of water from the hydrogen gas mixture stream into the second adsorbent bed.

4. The method of claim 3, wherein the quantity of water adsorbed by the first adsorbent bed during the first time period is substantially the same as the quantity of water adsorbed by the second adsorbent bed during the second time period.

5. The method of claim 4, wherein each of the quantity of water adsorbed by the first adsorbent bed during the first time period and the quantity of water adsorbed by the second adsorbent bed during the second time period is less than the maximum quantity of water that can be adsorbed by the respective first and second adsorbent beds.

6. The method of claim 1, wherein regenerating the first adsorbent bed includes directing a different gas stream through the first adsorbent bed, and desorbing a quantity of water from the first adsorbent bed into the different gas stream.

7. The method of claim 1, wherein the hydrogen gas mixture stream is supplied by an electrochemical hydrogen compressor or electrolyzer.

8. The method of claim 6, wherein the different gas stream is a dry hydrogen gas stream.

9. The method of claim 6, wherein at least a portion of the different gas stream includes a portion of the hydrogen gas mixture stream after the hydrogen gas mixture stream passes through the first adsorbent bed.

10. The method of claim 1, wherein the mass flow rate of water $\dot{m}_{H2O}$ is determined at least by measuring the amount of water in the hydrogen gas mixture stream.

11. The method of claim 7, further comprising determining an electrochemical hydrogen compressor or electrolyzer stack current i, an electrochemical hydrogen compressor or electrolyzer outlet temperature T, an electrochemical hydrogen compressor or electrolyzer outlet pressure $P_{tot}$, and a constant k;
    wherein the mass flow rate of water $\dot{m}_{H2O}$ is determined at least by calculating the amount of water in the hydrogen gas mixture stream according to an equation $\dot{m}_{H2O}=k*i*T/P_{tot}$.

12. The method of claim 7, further comprising determining a mass flow rate of hydrogen $\dot{m}_{H2O}$, a concentration of water $C_{tot}$, and a constant k;
    wherein the mass flow rate of water $\dot{m}_{H2O}$ is determined at least by calculating the amount of water in the hydrogen gas mixture stream according to an equation $\dot{m}_{H2O}=k*\dot{m}_{H2}*C_{H2O}$.

13. A method of operating a pressure swing adsorption purifier, comprising:
    supplying a hydrogen gas mixture stream from an electrochemical hydrogen compressor to the pressure swing adsorption purifier;
    supplying a different gas stream to the pressure swing adsorption purifier;
    wherein the pressure swing adsorption purifier includes at least one first adsorbent bed and at least one second adsorbent bed;
    feeding the at least one first adsorbent bed, which includes adsorbing water from the hydrogen gas mixture stream into the at least one first adsorbent bed;
    regenerating the at least one second adsorbent bed, which includes desorbing water from the at least one second adsorbent bed into the different gas stream;
    feeding the at least one second adsorbent bed, which includes adsorbing water from the hydrogen gas mixture stream into the at least one second adsorbent bed;
    regenerating the at least one first adsorbent bed, which includes desorbing water from the at least one first adsorbent bed into the different gas stream; and
    switching between feeding the at least one first adsorbent bed and regenerating the at least one second adsorbent bed according to a switching time.

14. The method of claim 13, further comprising repeating switching between feeding the at least one first adsorbent bed and regenerating the at least one second adsorbent bed according to a different switching time.

15. The method of claim 13, further comprising determining a mass flow rate of water $\dot{m}_{H2O}$ in the hydrogen gas mixture stream;
   wherein the switching time is determined at least on the determined mass flow rate of water $\dot{m}_{H2O}$.

16. The method of claim 15, wherein the mass flow rate of water $\dot{m}_{H2O}$ is determined at least by measuring the amount of water in the hydrogen gas mixture stream.

17. The method of claim 15, wherein the hydrogen gas mixture stream is supplied by an electrochemical hydrogen compressor or electrolyzer and the method further comprises:
   determining the electrochemical hydrogen compressor or electrolyzer stack current i, the electrochemical hydrogen compressor or electrolyzer outlet temperature T, the electrochemical hydrogen compressor or electrolyzer outlet pressure $P_{tot}$, and a constant k;
   wherein the mass flow rate of water $\dot{m}_{H2O}$ is determined at least by calculating the amount of water in the hydrogen gas mixture stream according to an equation $\dot{m}_{H2O} = k \ast i \ast T / P_{tot}$.

18. The method of claim 15, wherein the hydrogen gas mixture stream is supplied by an electrochemical hydrogen compressor or electrolyzer and the method further comprises:
   determining a mass flow rate of hydrogen dim, a concentration of water $C_{tot}$, and a constant k;
   wherein the mass flow rate of water $\dot{m}_{H2O}$ is determined at least by calculating the amount of water in the hydrogen gas mixture stream according to an equation $\dot{m}_{H2O} = k \ast \dot{m}_{H2} \ast C_{H2O}$.

19. An apparatus comprising:
   a controller for operating one or more downstream valves of an electrochemical hydrogen compressor or an electrolyzer;
   a temperature sensor configured to measure the outlet temperature of the electrochemical hydrogen compressor or the electrolyzer;
   a circuit configured to determine the stack current of the electrochemical hydrogen compressor or the electrolyzer; and
   a pressure sensor configured to measure the outlet pressure of the electrochemical hydrogen compressor or the electrolyzer;
   wherein the controller is configured to determine an outlet mass flow rate of water in a hydrogen gas mixture stream based on the outlet temperature, the stack current, and the outlet pressure; and
   wherein the one or more valves includes a first valve and the controller is configured to open and close the first valve based at least on the determined outlet mass flow rate of water.

20. The apparatus of claim 19, wherein the controller is configured to determine a switching time based at least on the outlet mass flow rate of water for opening and closing the first valve; and
   wherein the first valve is opened and closed based on the switching time.

21. The apparatus of claim 19, wherein the electrochemical hydrogen compressor or the electrolyzer is in fluid communication a pressure swing adsorption purifier having a first adsorbent bed; and
   wherein the controller is configured to open and close the first valve based at least on an adsorbent capacity of the adsorbent bed.

22. The apparatus of claim 21, wherein the pressure swing adsorption purifier includes a second adsorbent bed;
   wherein the controller is configured to determine a switching time for opening and closing the first valve based at least on the determined outlet mass flow rate of water, the adsorbent capacity of the first adsorbent bed, and an adsorbent capacity of the second adsorbent bed; and
   wherein the first valve is opened and closed based on the switching time.

23. The apparatus of claim 19, wherein the one or more valves includes a second valve and the controller is configured to open and close the second valve based at least on the determined outlet mass flow rate of water; and
   wherein the first valve and the second valve are opened asynchronously or closed asynchronously.

* * * * *